United States Patent
Shinohara et al.

(10) Patent No.: US 12,074,655 B2
(45) Date of Patent: Aug. 27, 2024

(54) WIRELESS COMMUNICATION CHARACTERISTIC EVALUATION METHOD AND WIRELESS COMMUNICATION CHARACTERISTIC EVALUATION DEVICE

(71) Applicant: NIPPON TELEGRAPH AND TELEPHONE CORPORATION, Tokyo (JP)

(72) Inventors: Shoko Shinohara, Musashino (JP); Toshiro Nakahira, Musashino (JP); Yasuhiko Inoue, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 332 days.

(21) Appl. No.: 17/600,563
(22) PCT Filed: Mar. 24, 2020
(86) PCT No.: PCT/JP2020/013135
§ 371 (c)(1),
(2) Date: Sep. 30, 2021
(87) PCT Pub. No.: WO2020/203498
PCT Pub. Date: Oct. 8, 2020

(65) Prior Publication Data
US 2022/0216930 A1    Jul. 7, 2022

(30) Foreign Application Priority Data
Apr. 2, 2019  (JP) .................. 2019-070925

(51) Int. Cl.
*H04B 17/318* (2015.01)
*H04B 17/391* (2015.01)
(Continued)

(52) U.S. Cl.
CPC ......... *H04B 17/318* (2015.01); *H04B 17/391* (2015.01); *H04W 24/10* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,993,243 B1* | 4/2021 | Zhang | H04W 72/542 |
| 2017/0006563 A1* | 1/2017 | Lindoff | H04W 24/08 |

(Continued)

FOREIGN PATENT DOCUMENTS

| | | |
|---|---|---|
| JP | 201610131 A | 1/2016 |
| JP | 2018198384 A | 12/2018 |
| JP | 201933441 A | 2/2019 |

OTHER PUBLICATIONS

The 802.11 Working Group of the LAN/MAN Standards Committee of the IEEE Computer Society, Part 11: Wireless LAN Medium Access Control (MAC) and Physical Layer (PHY) Specifications, IEEE Std 802.11-2016,IEEE Standard for Information technology—Telecommunications and information exchange between systems Local and metropolitan area networks—Specific requirements, Dec. 2016.

(Continued)

*Primary Examiner* — Diane L Lo
(74) *Attorney, Agent, or Firm* — Harness, Dickey & Pierce, P.L.C.

(57) ABSTRACT

A wireless communication characteristic evaluation method for calculating a wireless communication characteristic of a wireless communication system in which a plurality of wireless communication terminals perform communication by transmitting or exchanging signals includes: an RSSI measurement step of measuring an RSSI measurement used for calculation of the wireless communication characteristic;

(Continued)

and a calculation step of calculating the wireless communication characteristic based on the RSSI measurement and correction data of the RSSI measurement according to specifications of the wireless communication terminals or a correction calculation model.

10 Claims, 6 Drawing Sheets

(51) Int. Cl.
  *H04W 24/10* (2009.01)
  *H04W 84/12* (2009.01)

(56) References Cited

U.S. PATENT DOCUMENTS

| | | | |
|---|---|---|---|
| 2018/0041985 A1* | 2/2018 | Davaadorj | H04W 64/003 |
| 2018/0091989 A1* | 3/2018 | Baroudi | H04W 4/70 |
| 2018/0270680 A1* | 9/2018 | Van Doorselaer | H04L 43/16 |

OTHER PUBLICATIONS

Ron Porat et al., 11ax Evaluation Methodology, IEEE P802.11 Wireless LANs, Jan. 21, 2016.

* cited by examiner

| | EVALUATION CONDITIONS SPECIFIED FROM DATABASE | | | MEASUREMENT | SIMULATION RESULT | |
|---|---|---|---|---|---|---|
| | MAXIMUM MCS | MAXIMUM NUMBER OF AGGREGATIONS | NF [dB] | RSSI [dBm] | THROUGHPUT VALUE [Mbps] | |
| TERMINAL 1 | 7 | 64 | 10 | -62 | 261.19 | DIFFERENT IN MAXIMUM MCS OR MAXIMUM NUMBER OF AGGREGATIONS |
| TERMINAL 2 | 9 | 64 | 10 | -62 | 340.49 | |
| TERMINAL 3 | 7 | 32 | 10 | -62 | 245.09 | |
| TERMINAL 4 | 7 | 32 | 10 | -72 | 105.81 | |
| TERMINAL 5 | 7 | 32 | 7 | -72 | 154.16 | DIFFERENT IN NF |

Fig. 6

WIRELESS COMMUNICATION CHARACTERISTIC EVALUATION METHOD AND WIRELESS COMMUNICATION CHARACTERISTIC EVALUATION DEVICE

CROSS-REFERENCE TO RELATED APPLICATIONS

This application is a 371 U.S. National Phase of International Application No. PCT/JP2020/013135 filed on Mar. 24, 2020, which claims priority to Japanese Application No. 2019-070925 filed on Mar. 1, 2019. The entire disclosures of the above applications are incorporated herein by reference.

TECHNICAL FIELD

The present invention relates to a wireless communication characteristic evaluation method and a wireless communication characteristic evaluation device for evaluating a wireless communication characteristic such as a throughput, using parameters such as a measured RSSI measurement, in a wireless communication system in which a plurality of wireless communication terminals perform wireless communication.

BACKGROUND ART

In the case of using wireless communication of a wireless LAN and the like of Non-Patent Literature 1, wireless communication characteristics such as a throughput change due to influence given by a surrounding environment, such as interference. Since the surrounding environment differs according to places, the wireless communication characteristics differ for each place. Therefore, in order to grasp the wireless communication characteristics within a wide range, evaluation by measurement at a lot of places or simulation is required.

However, as for wireless communication standards for wireless LAN and the like, a plurality of kinds of standards exist. Since they mixedly exist in the same area, it is difficult to grasp various wireless communication characteristics. As an existing method, there is a method of determining a lot of measurement points in an area and measuring all wireless communication characteristics to be acquired, at each of the measurement points. However, this method requires much time and cost. Therefore, a method is conceivable as another method in which a part of the measurement points or a part of the wireless communication characteristics are measured to acquire wireless communication characteristics in the area, and, for the other measurement points or the other wireless communication characteristics, they are calculated by reproducing a wireless communication environment by computer simulation, using the measurements. If the latter method is used, various wireless communication characteristics can be acquired at a lower cost. Actually, however, any of the methods is selected as needed.

CITATION LIST

Non-Patent Literature

Non-Patent Literature 1: "IEEE P802.11-2016," December 2016

Non-Patent Literature 2: "11ax Evaluation Methodology," doc.:IEEE802.11-14/0571r12 Jan. 2016

SUMMARY OF THE INVENTION

Technical Problem

In the case of performing measurement to acquire a wireless communication characteristic of a wireless LAN, it is difficult to acquire stable results because a measurement differs according to model-specific model characteristics of a measurement tool used. Further, since all operations of an apparatus actually used are not specified by wireless communication standards, a theoretical throughput assumed for each apparatus (model) or for each scenario is not obtained. Therefore, a deviation from an actual measurement result occurs, and it is difficult to acquire a desired wireless communication characteristic when computer simulation is used.

An object of the present invention is to provide a wireless communication characteristic evaluation method and a wireless communication characteristic evaluation device capable of minimizing an error relative to an actual measurement in computer simulation for calculating a wireless communication characteristic of a wireless communication system.

Means for Solving the Problem

A first invention is a wireless communication characteristic evaluation method for calculating a wireless communication characteristic of a wireless communication system in which a plurality of wireless communication terminals perform communication by transmitting or exchanging signals, the wireless communication characteristic evaluation method including: an RSSI measurement step of measuring an RSSI measurement used for calculation of the wireless communication characteristic; and a calculation step of calculating the wireless communication characteristic based on the RSSI measurement and correction data of the RSSI measurement according to specifications of the wireless communication terminals or a correction calculation model.

In the wireless communication characteristic evaluation method of the first invention, the RSSI measurement step measures an RSSI measurement of a beacon beforehand; and the calculation step calculates the wireless communication characteristic using the correction data obtained by correcting the RSSI measurement with an RSSI correction value according to the specifications of the wireless communication terminals.

In the wireless communication characteristic evaluation method of the first invention, the RSSI measurement step measures an RSSI measurement of a beacon beforehand; and the calculation step calculates the wireless communication characteristic using the correction data obtained by correcting the RSSI measurement with an RSSI value error range according to the specifications of the wireless communication terminals.

In the wireless communication characteristic evaluation method of the first invention, the RSSI measurement step measures an RSSI measurement of a beacon beforehand; and the calculation step calculates the wireless communication characteristic by the RSSI measurement and the correction calculation model using evaluation conditions according to the specifications of the wireless communication terminals.

In the wireless communication characteristic evaluation method of the first invention, the RSSI measurement step measures an RSSI measurement of a beacon and the wireless communication characteristic at a measurement point of the RSSI measurement beforehand; and the calculation step calculates the wireless communication characteristic by the correction calculation model comparing a wireless communication characteristic calculated from the RSSI measurement and the wireless communication characteristic measured at the measurement point and selecting such a parameter that an error rate is minimized.

A second invention is a wireless communication characteristic evaluation device calculating a wireless communication characteristic of a wireless communication system in which a plurality of wireless communication terminals perform communication by transmitting or exchanging signals, the wireless communication characteristic evaluation device including: RSSI measurement means for measuring an RSSI measurement used for calculation of the wireless communication characteristic; and calculation means for calculating the wireless communication characteristic based on the RSSI measurement and correction data of the RSSI measurement according to specifications of the wireless communication terminals or a correction calculation model.

Effects of the Invention

The present invention can minimize an error that occurs between an actual measurement of a wireless communication characteristic (throughput) and computer simulation, especially an error from an actual value that occurs according to terminal specifications and scenarios and acquire a highly accurate wireless communication characteristic in a short time.

DESCRIPTION OF EMBODIMENTS

Figure 1:
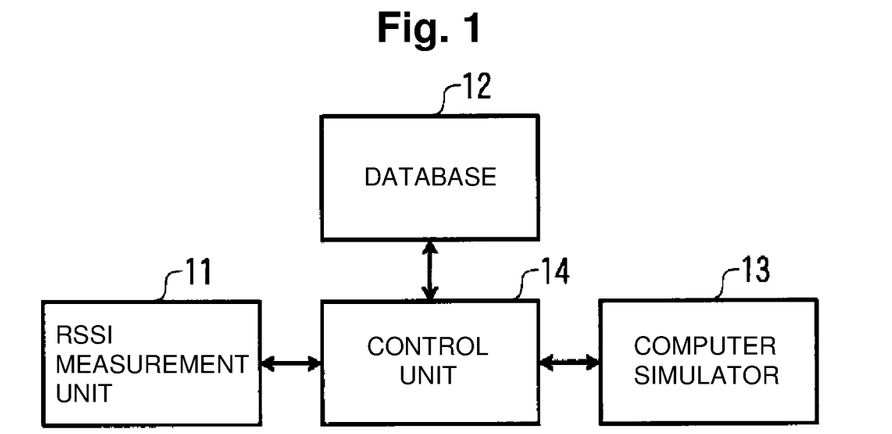
FIG. 1 is a diagram showing a configuration example of a wireless communication characteristic evaluation device of the present invention.

FIG. 1 shows a configuration example of a wireless communication characteristic evaluation device of the present invention.

Though an example in which a throughput value and an RSSI value are used as a wireless communication characteristic and a parameter for calculating throughput, respectively, is shown here, the same goes for other wireless communication characteristics and parameters.

In FIG. 1, the wireless communication characteristic (throughput) evaluation device is configured with an RSSI measurement unit 11, a database 12, a computer simulator 13 and a control unit 14. The RSSI measurement unit 11 measures an RSSI value of a beacon. The database 12 stores RSSI correction values, RSSI error ranges or evaluation conditions corresponding to terminal specifications. The computer simulator 13 calculates a throughput corresponding to the RSSI value. The control unit 14 outputs the RSSI measurement measured by the RSSI measurement unit 11 to the computer simulator 13 and outputs an RSSI correction value, an RSSI error range or evaluation conditions read from the database 12 according to terminal specifications to the computer simulator 13 to cause the computer simulator 13 to calculate a corresponding throughput.

In this configuration, by modeling deviations between measurements and computer simulation results and creating the database thereof, it is possible to correct an apparatus characteristic at the time of performing measurement for a predetermined communication terminal by a predetermined measurement apparatus in a predetermined wireless communication environment. For example, in the case of calculating a throughput by the computer simulator using an RSSI value acquired by a beacon, MIMO is used actually, and, therefore, an RSSI value of a data frame received using MIMO is higher than the RSSI value of the beacon. Therefore, when it is assumed from specifications of transmitting and receiving terminals that MIMO is used for data frame transmission, in the case of performing calculation by the computer simulator, for example, the RSSI value acquired by the beacon is set higher by several dB. In addition, since an error occurs in the RSSI value depending on an apparatus, a throughput value may be corrected based on a throughput error range assuming the error, or throughputs of an actual measurement and computer simulation are compared based on a deviation state of the throughputs and a scenario modeled beforehand to minimize the error by parameter settings for the computer simulation. Each calculation method will be specifically described below.

(First Calculation Method)

A first calculation method for wireless communication characteristic (throughput) of the present invention is a procedure of measuring an RSSI value of a beacon beforehand as a parameter value for calculating a throughput, and calculating the throughput by the computer simulator after correcting the RSSI measurement assuming an actual data signal.

Figure 2:
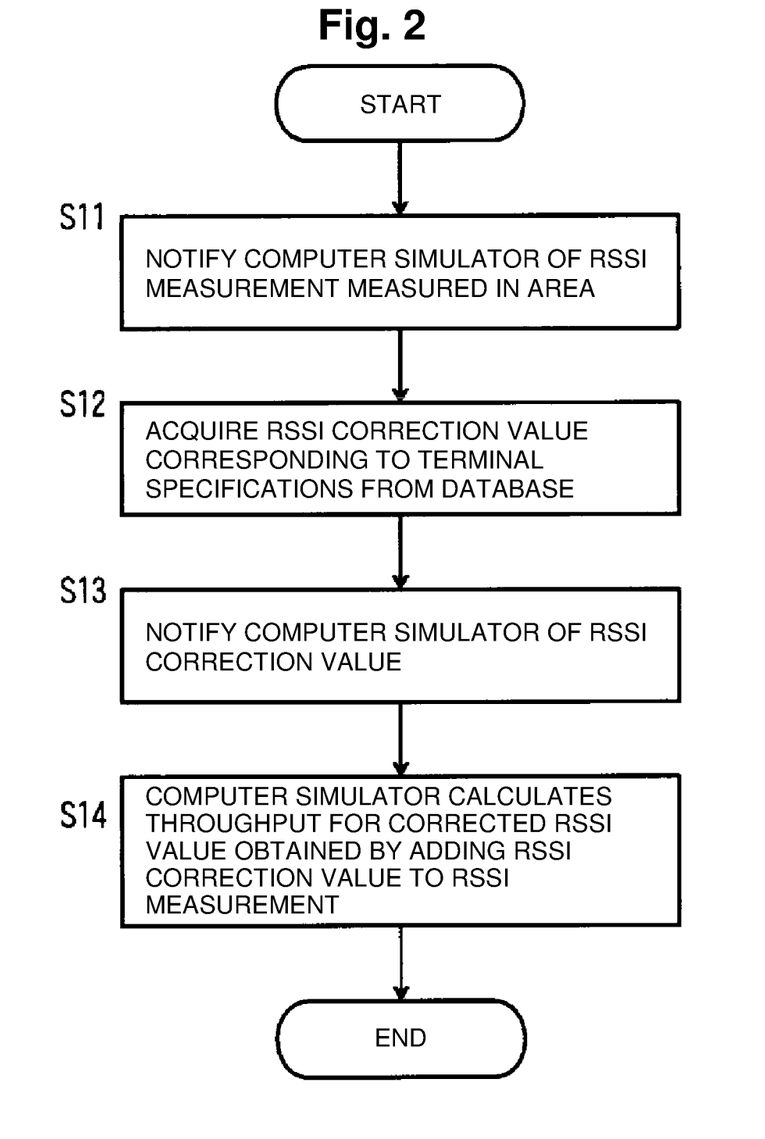
FIG. 2 is a flowchart showing a process procedure example of a first calculation method for wireless communication characteristic (throughput) of the present invention.

FIG. 2 shows a process procedure example of the first calculation method for wireless communication characteristic (throughput) of the present invention.

In FIG. 2, first, an RSSI value of a beacon signal transmitted from a transmitting terminal to be a throughput calculation target in an area is measured, and the computer simulator is notified of the RSSI measurement (S11). Note that, instead of measuring the RSSI value of the beacon signal, the RSSI value may be calculated by propagation simulation.

Next, the database is notified of data, such as possibility/impossibility of MIMO and the number of streams, obtained from terminal specifications of the transmitting terminal and a receiving terminal, such as the numbers of antennas, wireless communication standards and models, and an RSSI correction value corresponding to the terminal specifications is acquired from the database (S12). At this time, if room sizes and materials are also known, and the categories exist in the database, data of these may be included and notified. In the database, differences between signals of measurement of RSSI values (in this example, beacon signals) and the RSSI values at the time of receiving MIMO used at the time of data transmission are stored as RSSI correction values.

Next, the computer simulator is notified of an RSSI correction value corresponding to the terminal specifications acquired from the database (S13). The computer simulator calculates a throughput for a data signal of the terminals using MIMO, using a corrected RSSI value obtained by adding the RSSI correction value to the notified RSSI measurement (S14).

(Second Calculation Method)

A second calculation method for wireless communication characteristic (throughput) of the present invention is a procedure of measuring an RSSI value of a beacon beforehand as a parameter value for calculating a throughput, and calculating the throughput by computer simulation, using the RSSI measurement and an RSSI value error range corresponding to terminal specifications.

Figure 3:
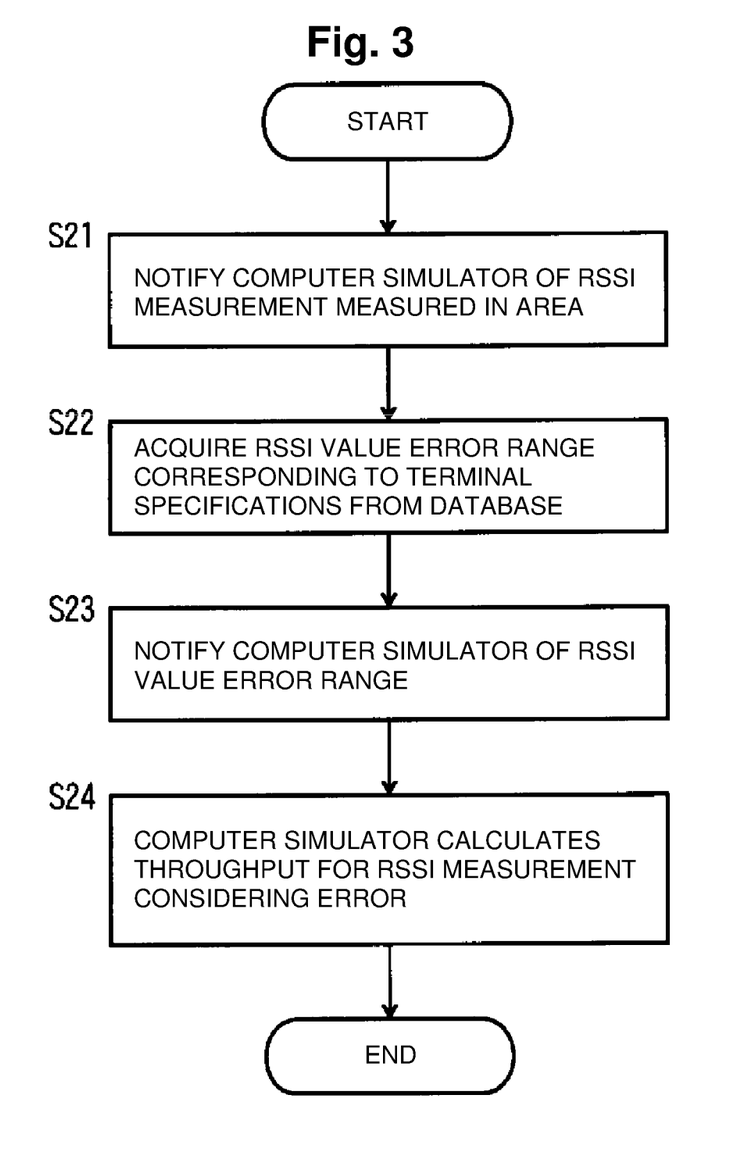
FIG. 3 is a flowchart showing a process procedure example of a second calculation method for wireless communication characteristic (throughput) of the present invention.

FIG. 3 shows a process procedure example of the second calculation method for wireless communication characteristic (throughput) of the present invention.

In FIG. 3, first, an RSSI value of a beacon signal transmitted from a transmitting terminal to be a throughput calculation target in an area is measured, and the computer simulator is notified of the RSSI measurement (S21). Note that, instead of measuring the RSSI value of the beacon signal, the RSSI value may be calculated by propagation simulation.

Next, the database is notified of information about terminal specifications and models of a transmitting terminal, a receiving terminal and the like, and an RSSI value error range corresponding to the terminal specifications is acquired from the database (S22). Note that an error for an RSSI measurement is assumed as ±3 dB or ±5 dB according to device classes of wireless communication terminals, and RSSI value error ranges corresponding to terminal specifications are stored in the database.

Next, the computer simulator is notified of an RSSI value error range corresponding to the terminal specifications acquired from the database (S23). For the notified RSSI measurement, the computer simulator calculates a throughput considering an error of the RSSI measurement (S24). Note that the throughput calculation considering an error is, for example, calculation in which calculation is performed with a throughput calculated by adding 3 dB to the RSSI measurement as a maximum value, and a throughput calculated by subtracting 3 dB as a minimum value, and a mean value between the maximum and minimum values is determined and set as a throughput value of the place.

(Third Calculation Method)

A third calculation method for wireless communication characteristic (throughput) of the present invention is a procedure of measuring an RSSI value of a beacon beforehand as a parameter value for calculating a throughput, and calculating the throughput by computer simulation, using the RSSI measurement and evaluation conditions corresponding to terminal specifications.

Figure 4:
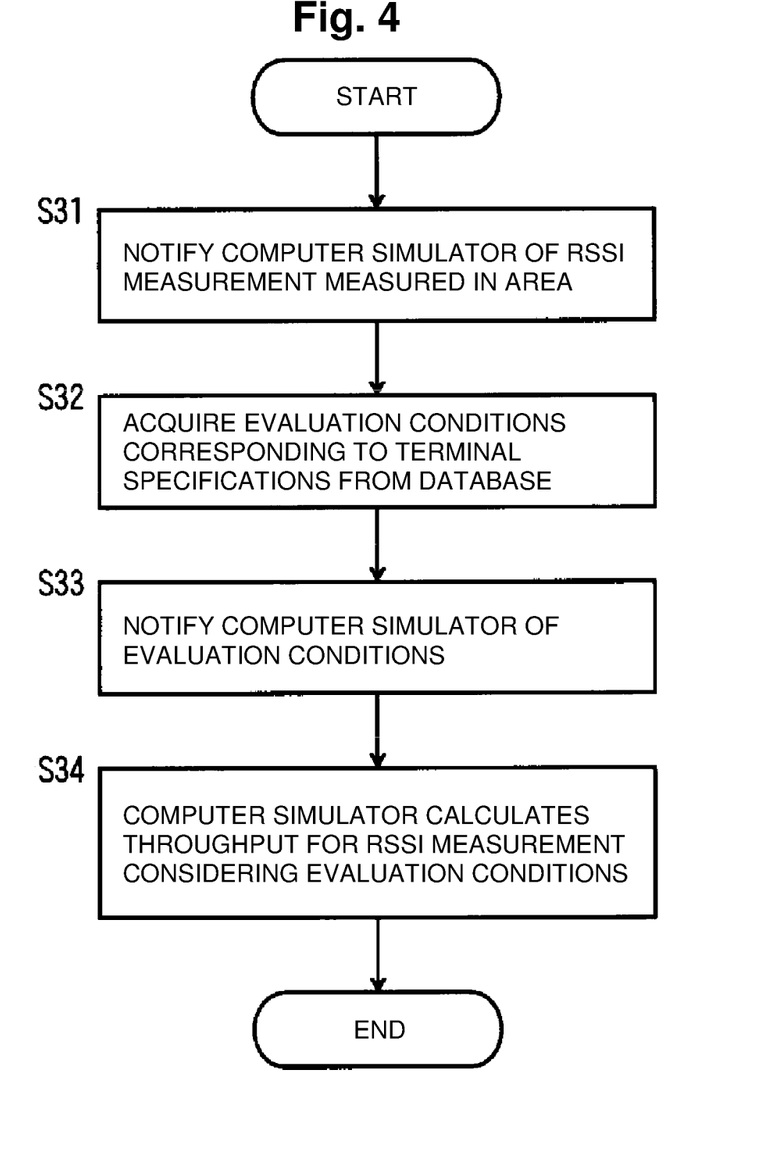
FIG. 4 is a flowchart showing a process procedure example of a third calculation method for wireless communication characteristic (throughput) of the present invention.

FIG. 4 shows a process procedure example of the third calculation method for wireless communication characteristic (throughput) of the present invention.

In FIG. 4, first, an RSSI value of a beacon signal transmitted from a transmitting terminal to be a throughput calculation target in an area is measured, and the computer simulator is notified of the RSSI measurement (S31). Note that, instead of measuring the RSSI value of the beacon signal, the RSSI value may be calculated by propagation simulation.

Next, the database is notified of information about terminal specifications and models of a transmitting terminal, a receiving terminal and the like, and evaluation conditions corresponding to the terminal specifications are acquired from the database (S32). In the database, evaluation conditions according to terminal specifications and models are stored. The evaluation conditions are, for example, wireless parameters that are treated as an option in standards for a maximum MCS and the like. The wireless parameters are not necessarily the same evaluation conditions even if the same standards are supported. Supported optional functions differ for each apparatus/model. In the database, the optional functions and the like are registered, and evaluation conditions and wireless parameters are outputted by being determined from inputted conditions. In addition, the maximum number of aggregations, a transmission queue size, a CCA threshold, an NF (Noise Figure) and the like that differ for each model, can be registered with the database and are given as evaluation conditions and wireless parameters that can be inquired with input conditions.

Next, the computer simulator is notified of the evaluation conditions corresponding to the terminal specifications acquired from the database (S33). The computer simulator calculates a throughput for the RSSI measurement considering the notified evaluation conditions (S34).

Figure 5:
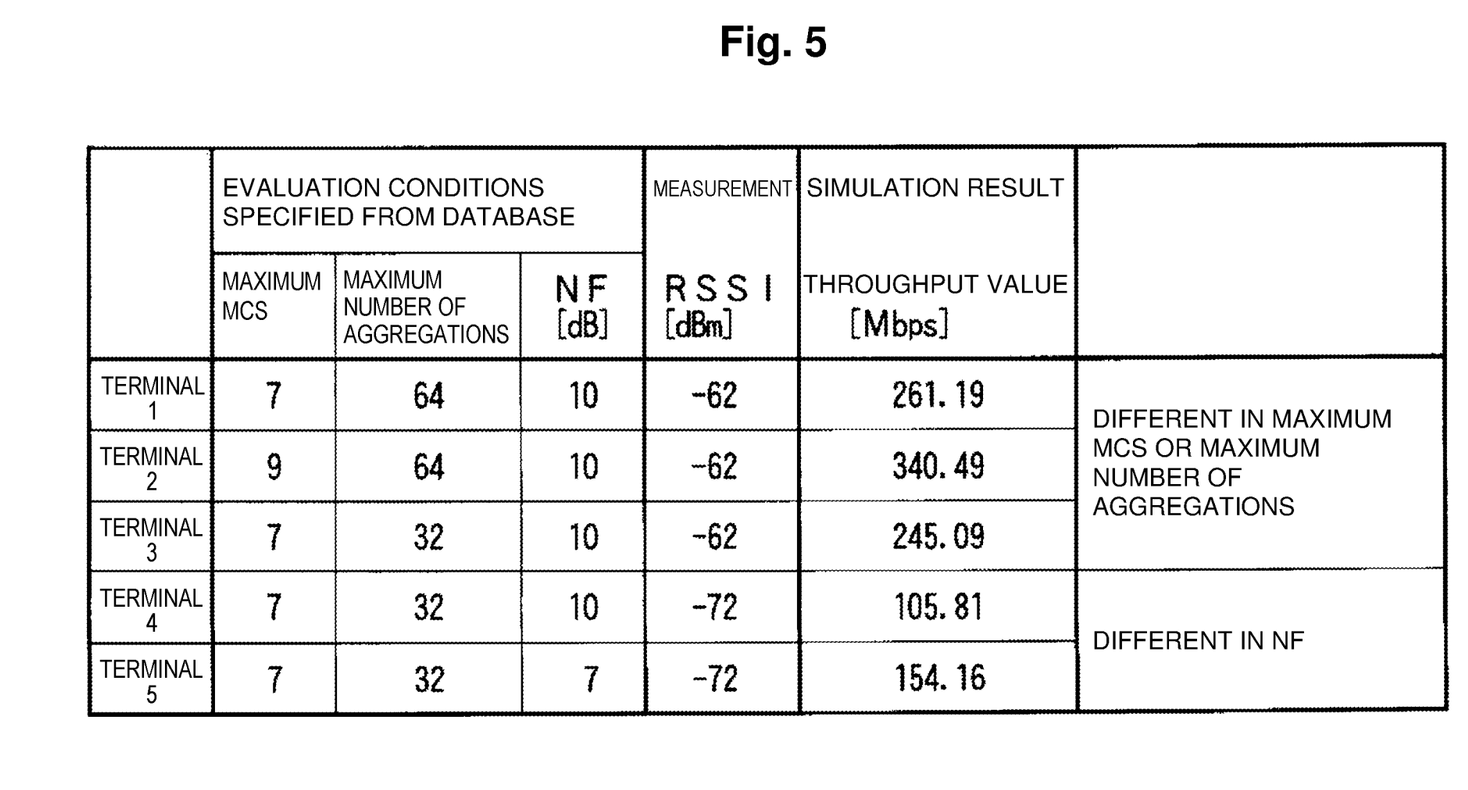
FIG. 5 is a diagram showing a throughput calculation example considering evaluation conditions.

FIG. 5 shows an example of calculation of a throughput considering evaluation conditions.

Here, as the evaluation conditions specified from the database, the maximum MCS, the maximum number of aggregations and an NF are assumed. RSSI values measured by terminals 1 to 5 are the same. The terminals 1 to 3 are examples of being different in the maximum MCS and the maximum number of aggregations, and the terminals 4 and 5 are examples of being different in the NF.

(Fourth Calculation Method)

A fourth calculation method for wireless communication characteristic (throughput) of the present invention is a procedure of measuring an RSSI value of a beacon beforehand, and changing setting parameters to such setting parameters that an error between a throughput calculated for the RSSI measurement and an actually measured throughput becomes small to calculate the throughput.

Figure 6:
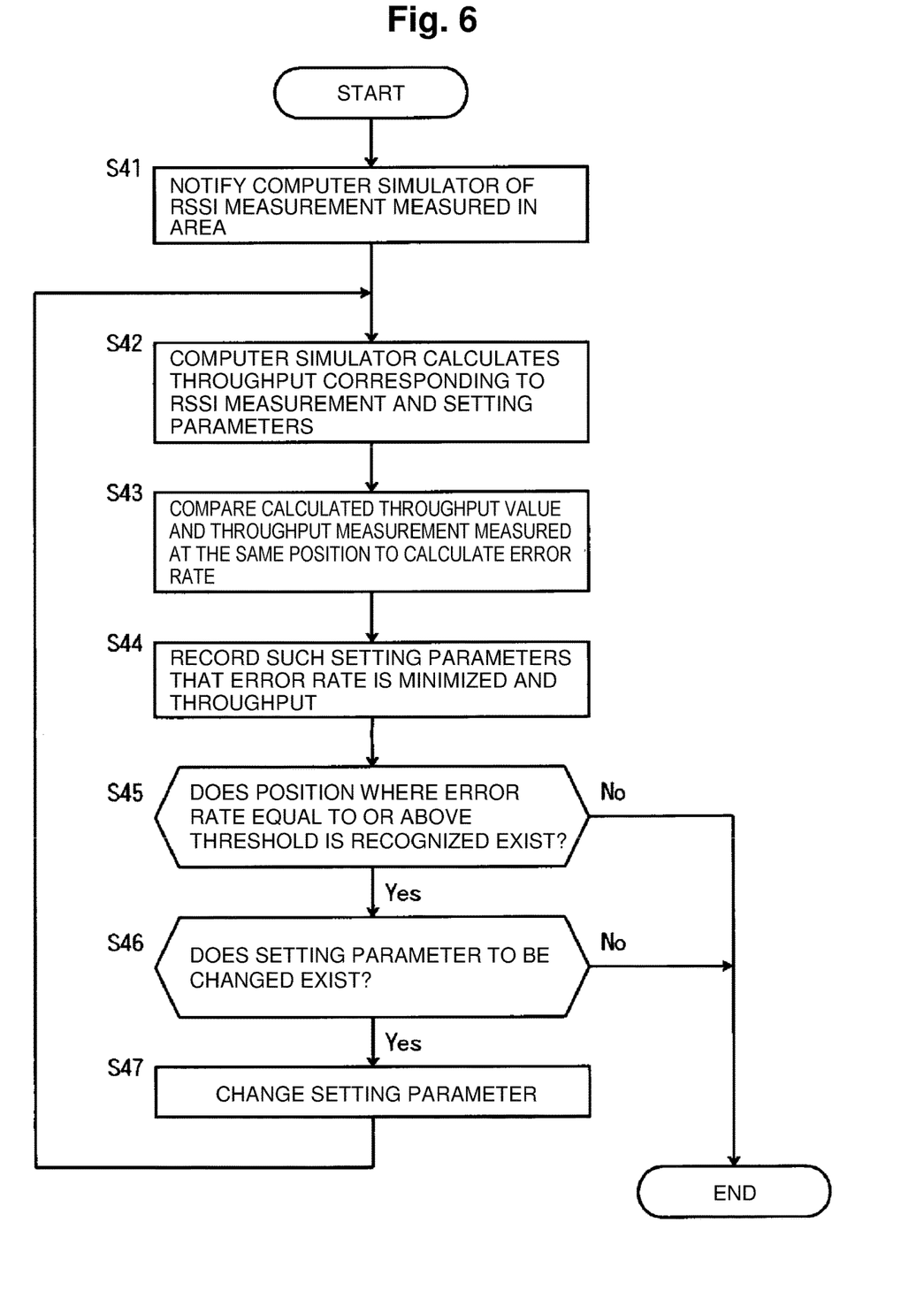
FIG. 6 is a flowchart showing a process procedure example of a fourth calculation method for wireless communication characteristic (throughput) of the present invention.

FIG. 6 shows a process procedure example of the fourth calculation method for wireless communication characteristic (throughput) of the present invention.

In FIG. 6, first, an RSSI value of a beacon signal transmitted from a transmitting terminal to be a throughput calculation target in an area is measured, and the computer simulator is notified of the RSSI measurement (S41). Note that, instead of measuring the RSSI value of the beacon signal, the RSSI value may be calculated by propagation simulation. Further, at a point where the RSSI value is measured, a throughput is also measured.

Next, the computer simulator calculates a throughput for the RSSI measurement (S42).

Next, the calculated value of the throughput and the throughput measurement measured at the same position as the RSSI measurement are compared to calculate an error rate (S43).

Next, such parameters that the error rate is minimized and the throughput are recorded (S44).

Next, it is confirmed whether a position where an error rate equal to or above a threshold is recognized exists (S45). If the position where the error rate is equal to or above the threshold exists (S45: Yes), a parameter thought to be changed is confirmed (S46). If the parameter to be changed exists (S46: Yes), the setting parameter is changed (S47), and the procedure returns to step S42, where a throughput is calculated again.

Here, an error rate is calculated again from the throughput calculated with the parameters after the change, and the parameters after the change and a throughput value are recorded if the error rate is minimized (S44). Then, when the error rate becomes equal to or below the threshold (S45: No) or when there are not any more parameters that can be set (S46: No), the procedure ends.

Here, the parameters to be changed are parameters about settings for access control, for example, presence/absence of RTS/CTS and enable/disable of threshold control, and settings for a physical layer. Further, as for the parameters to be changed, parameters to be changed are determined from a database in which similar scenarios are modeled and can be treated as the parameters to be changed. For example, in an environment where a hidden terminal has occurred, throughputs with RTS/CTS and throughputs without RTS/CTS are modeled in advance. If correlation between a result of the case with RTS/CTS and a measurement result is high, and correlation between a result of the case without RTS/CTS and computer simulation is high, presence/absence of RTS/CTS is registered as a parameter to be changed.

REFERENCE SIGNS LIST

11 RSSI measurement unit
12 Database
13 Computer simulator
14 Control unit

The invention claimed is:

1. A wireless communication characteristic evaluation method for calculating a wireless communication characteristic of a wireless communication system in which a plurality of wireless communication terminals perform communication by transmitting or exchanging signals, the wireless communication characteristic evaluation method comprising:
an RSSI measurement step of measuring an RSSI measurement used for calculation of the wireless communication characteristic; and
a calculation step of calculating throughput based on the RSSI measurement and correction data of the RSSI measurement according to specifications of the wireless communication terminals,
wherein the specifications of the wireless communication terminals include at least two of (a) an indicator of whether MIMO communication is possible, (b) numbers of antennas of the wireless communication terminals, (c) a wireless communication standard used by the wireless communication terminals, and (d) models of the wireless communication terminals.

2. The wireless communication characteristic evaluation method according to claim 1, wherein
the RSSI measurement step measures an RSSI measurement of a beacon beforehand; and
the calculation step calculates the throughput using the correction data obtained by correcting the RSSI measurement with an RSSI correction value according to the specifications of the wireless communication terminals.

3. The wireless communication characteristic evaluation method according to claim 1, wherein
the RSSI measurement step measures an RSSI measurement of a beacon beforehand; and
the calculation step calculates the throughput using the correction data obtained by correcting the RSSI measurement with an RSSI value error range according to the specifications of the wireless communication terminals.

4. The wireless communication characteristic evaluation method according to claim 1, wherein
the RSSI measurement step measures an RSSI measurement of a beacon beforehand; and
the calculation step calculates the throughput by the RSSI measurement and using evaluation conditions according to the specifications of the wireless communication terminals.

5. The wireless communication characteristic evaluation method according to claim 1, wherein
the RSSI measurement step measures an RSSI measurement of a beacon and the throughput at a measurement point of the RSSI measurement beforehand; and
the calculation step calculates the throughput by comparing a throughput calculated from the RSSI measurement and the throughput measured at the measurement point and selecting such a parameter that an error rate is minimized.

6. A wireless communication characteristic evaluation device calculating a throughput of a wireless communication system in which a plurality of wireless communication terminals perform communication by transmitting or exchanging signals, the wireless communication characteristic evaluation device comprising:
a processor; and
a storage medium having computer program instructions stored thereon, when executed by the processor, perform to:
measuring an RSSI measurement used for calculation of throughput; and
calculating the throughput based on the RSSI measurement and correction data of the RSSI measurement according to specifications of the wireless communication terminals,
wherein the specifications of the wireless communication terminals include at least two of (a) an indicator of whether MIMO communication is possible, (b) numbers of antennas of the wireless communication terminals, (c) a wireless communication standard used by the wireless communication terminals, and (d) models of the wireless communication terminals.

7. The wireless communication characteristic evaluation device according to claim 6, wherein the instructions, when executed, perform to:
measure an RSSI measurement of a beacon beforehand; and
calculate the throughput using the correction data obtained by correcting the RSSI measurement with an RSSI correction value according to the specifications of the wireless communication terminals.

8. The wireless communication characteristic evaluation device according to claim 6, wherein the instructions, when executed, perform to:
measure an RSSI measurement of a beacon beforehand; and
calculate the throughput using the correction data obtained by correcting the RSSI measurement with an RSSI value error range according to the specifications of the wireless communication terminals.

9. The wireless communication characteristic evaluation device according to claim 6, wherein the instructions, when executed, perform to:
measure an RSSI measurement of a beacon beforehand; and
calculate the throughput by the RSSI measurement and using evaluation conditions according to the specifications of the wireless communication terminals.

10. The wireless communication characteristic evaluation device according to claim 6, wherein the instructions, when executed, perform to:
- measure an RSSI measurement of a beacon and the throughput at a measurement point of the RSSI measurement beforehand; and
- calculate the throughput by comparing a throughput calculated from the RSSI measurement and the throughput measured at the measurement point and selecting such a parameter that an error rate is minimized.

* * * * *